Jan. 28, 1964 J. W. DODSWORTH 3,119,539

TAPE TRANSPORT MEANS

Filed Jan. 23, 1962

INVENTOR.
JAMES W. DODSWORTH

BY George V. Hall

ATTORNEY

United States Patent Office 3,119,539

Patented Jan. 28, 1964

3,119,539

TAPE TRANSPORT MEANS

James W. Dodsworth, Mount Tabor, N.J., assignor to Monroe Calculating Machine Company, Orange, N.J., a corporation of Delaware Filed Jan. 23, 1962, Ser. No. 168,189
10 Claims. (Cl. 226—199)

This invention relates to record tape transport means for data processing apparatus, and more particularly to means for guiding a tape at its edges as it moves through the processing apparatus. Such processing apparatus may be either a recorder or a reader and the tape may be either punched or magnetic.

As the tape is fed toward the reading or recording station of the processing apparatus, it must be guided at its edges so that it will be accurately aligned with the reading or recording devices. In apparatus of the above type, it is usual to provide for the processing of different width tapes, and therefore the edge guide means must be adjustable to accommodate the different widths.

The processing apparatus may be alternatively operable in accordance with the number of channels associated with the different width tapes. Therefore electrical switching means may be adjustable to positions respectively corresponding to the different width tapes thereby conditioning the circuitry of the apparatus for processing the tapes in accordance with the number of channels.

It is the primary object of the invention to provide an improved tape edge guide means which is rapidly adjustable by simple manipulation to accommodate different width tapes.

Another object of the invention is to condition the processing apparatus, with which the adjustable guide means is associated, for processing a given width tape by the means operable to adjust the guide means to accommodate said given width tape.

Other objects and advantages of the invention will appear from the following description with reference to the accompanying drawings in which.

Figures 1, 2:
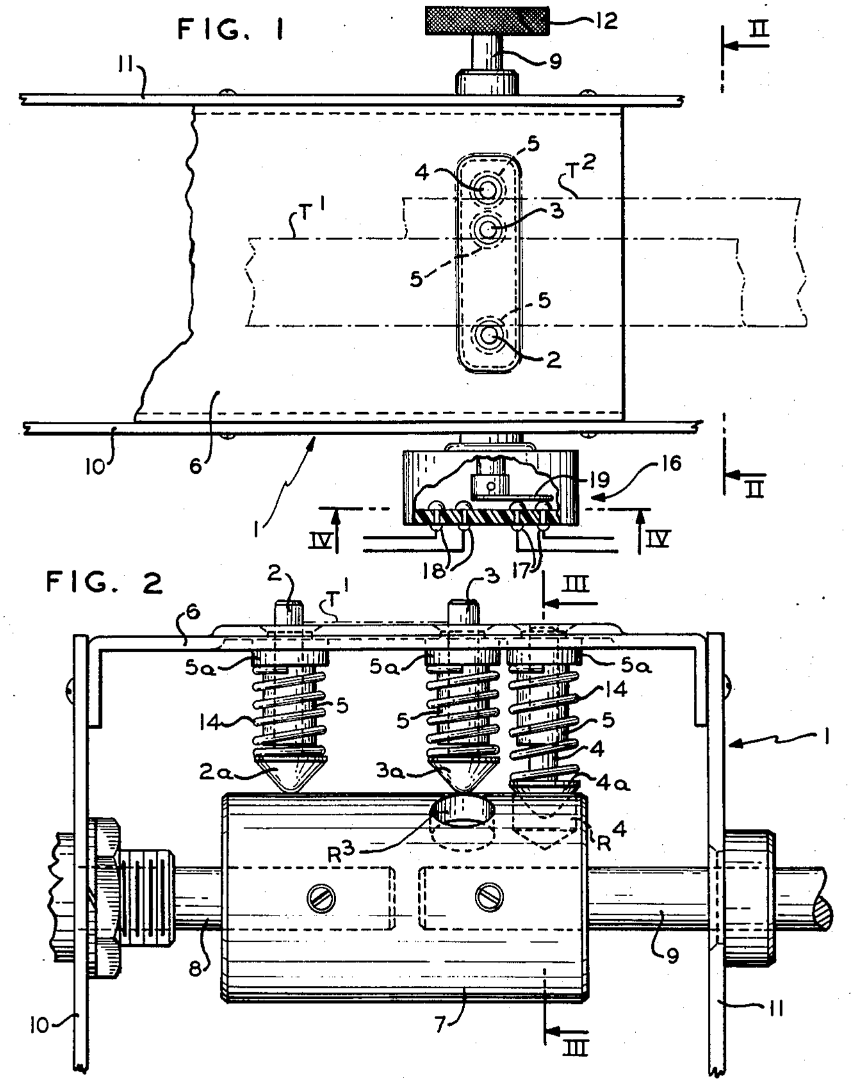
FIG. 1 is a fragmentary plan view of a data processing apparatus embodying the tape edge guide means of the invention.
FIG. 2 is an end view looking in the direction of the arrows of line II—II of FIG. 1.

The adjustable tape edge guide means of the invention is disclosed as embodied in a data processing apparatus generally indicated by the reference numeral 1. Such apparatus may be either a tape recorder or reader and includes a recording or reading station through which the tape is fed, tape feed means, and control mechanism and circuitry. This invention however is not concerned with the various components of the apparatus and they therefore are not shown.

The adjustable tape edge guide means includes a stationary pin 2, and two longitudinally adjustable pins 3 and 4. Each pin is fitted in a sleeve 5 which extends downwardly from the under side of a horizontally disposed plate 6 of the processing apparatus and is staked at its upper end in the plate.

Pin 2 is held in a fixed position, as later described with its upper end raised (FIG. 2) above the upper face of plate 6, whereas pins 3 and 4 are longitudinally adjustable in sleeves 5, so that either of the pins may be raised with its upper end above plate 6 while the other pin is retracted to lowered position with its upper end a slight distance below the face of plate 6.

Pin 3 is spaced transversely from fixed pin 2 with respect to the direction of tape feed. Therefore when pin 3 is raised, it is adapted to guide one edge of a given width tape $T^1$, shown in dot-dash lines (FIGS. 1, 2) while pin 2 guides the other edge. Pin 4 is spaced a greater distance transversely from pin 2, and therefore with pin 2, will guide a greater width tape $T^2$ also shown in dot-dash lines (FIG. 1). The upper ends of pins 2, 3, 4, may be of a reduced diameter and provided with rollers (not shown) of the diameter of the pin body to permit more easy passage of the tape.

Control means for pins 2, 3, 4 comprises a rotatable cylindrical member 7 which is axially fixed on shafts 8 and 9 journaled respectively in side plates 10 and 11 which support horizontal plate 6. Cylinder 7 is thus disposed longitudinally beneath the lower ends of the pins. A knob 12 is fixed at the end of shaft 9 for manual rotation of cylinder 7.

Pins 2, 3, and 4 respectively are provided with enlarged lower cone shaped ends 2*a*, 3*a*, and 4*a*. Compression springs 14 surround sleeves 5 and are trapped between enlarged pin ends 2*a*, 3*a*, 4*a* and flanges 5*a* at the upper ends of the sleeves. Pins 2, 3, 4 are therefore urged downwardly to engage their cone ends 2*a*, 3*a*, 4*a* with the face of cylinder 7. With the cone ends engaging the face of cylinder 7, pins 2, 3, and 4 are restrained with their upper ends projected in tape edge engaging position as shown by pins 2 and 3 (FIG. 2). Means however is adapted to selectively retract adjustable pins 3 and 4.

It will be noted that stationary pin 2 could be replaced by a fixed stud projecting upwardly from plate 6, and that pin 2 is constructed with associated parts in accordance with pins 3, 4 only for manufacturing expedience.

The means for selectively retracting pins 3, 4 includes circular recesses $R^3$, $R^4$ in the face of cylinder 7 and adapted to receive cone ends 3*a*, 4*a* of the pins.

Figure 3:
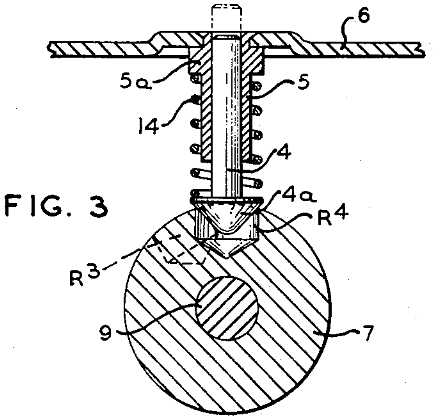
FIG. 3 is a detailed section taken on the line III—III of FIG. 2.

As shown in FIGS. 2 and 3, cylinder 7 has been rotated to permit entry of pin end 4*a* into recess $R^4$ under the urge of spring 14. Pin 4 therefore will be retracted to lowered position with its upper tape guiding end in disabled position below the face of plate 6. At this time, pin end 3*a* will be engaged with the face of cylinder 7, and pin 3 therefore will be restrained in raised position with its upper end in effective tape guiding position.

Rotation of cylinder 7 clockwise from the position of FIG. 3 will remove recess $R^4$ from engagement with pin end 4*a* and simultaneously engage recess $R^3$ with pin end 3*a*. Pin 3 therefore will be retracted downwardly to disabled position upon entry of end 3*a* into recess $R^3$, while pin 4 will be cammed upwardly to effective tape edge engaging position by the edge of recess $R^4$ acting on cone end 4*a* as the recess is moved from engagement with the cam end. Rotation of cylinder 7 counterclockwise will reverse the operation by restoring the parts to the position of FIGS. 2, 3 wherein pin 3 is in effective tape guiding position and pin 4 is in retracted disabled position.

Rotation of cylinder 7 to adjust pin 3 to tape guiding position is operable to adjust a switch 16 to one circuit controlling position, and alternatively rotation of the cylinder to adjust pin 4 to tape guiding position will adjust the switch to a second circuit controlling position.

The switch setting coincident with the enablement of guide pin 3 may be utilized to condition the circuitry of the processing apparatus for operation in accordance with the number of channels of the tape to be guided by pins 2, 3, whereas the switch setting coincident with the enablement of pin 4 may condition the circuitry for operation in accordance with the number of channels of the tape to be guided by pins 2, 4.

Figure 4:
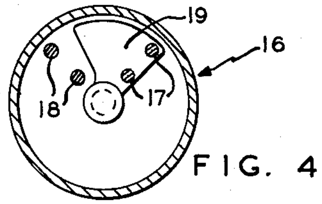
FIG. 4 is a view of a switch operable upon adjustment of the tape guide means taken on line IV—IV of FIG. 1.

Switch 16 comprises a first pair of contacts 17, a second pair of contacts 18, and a switch arm 19 fixed at the end of shaft 8. When cylinder 7 is rotated to enable guide pin 3, switch arm 19 is rotated to bridge contacts 17 and disengage contacts 18 as shown in FIGS. 1, 4.

Conversely, when cylinder 7 is rotated to enable pin 4, contacts 18 will be bridged and contacts 17 will be disengaged.

The apparatus has been disclosed as adjustable to accommodate two different width tapes. Obviously without departing from the principle of operation it could be designed to accommodate a great number of widths by supplying a corresponding number of adjustable guide pins and appropriately spacing control recesses in cylinder 7. It will be understood therefore that the invention is to be restricted only as necessitated by the scope and spirit of the appended claims.

What is claimed is:

1. In a tape transport:
guide means for one edge of a first or of a second given width tape;
a first guide member for the other edge of said first given width tape located on a line from said guide means normal to the direction of tape feed and adjustable to and from edge engaging position;
a second guide member for the other edge of said second given width tape located on said line from said guide means and adjustable to and from edge engaging position; and
means for selectively adjusting said guide members.

2. In a tape transport:
guide means for one edge of a first or of a second given width tape;
a first guide member for the other edge of said first given width tape adjustable to and from edge engaging position;
a second guide member for the other edge of said second given width tape adjustable to and from edge engaging position; and
means for adjusting one guide member to edge engaging position while adjusting the other guide member from edge engaging position and vice versa.

3. The invention according to claim 2 wherein:
said guide members are located on a line from said guide means normal to the direction of tape feed.

4. The invention according to claim 2 including:
electrical switching means adjustable to one circuit controlling position upon adjustment of said first guide member to edge engaging position, and adjustable to a second circuit controlling position upon adjustment of said second guide member to edge engaging position.

5. In a tape transport:
guide means for one edge of a first or of a second given width tape;
a first guide pin for the other edge of said first given width tape located on a line from said guide means normal to the direction of tape feed and longitudinally adjustable to and from edge engaging position;

a second guide pin for the other edge of said second given width tape located on said line from said guide means and longitudinally adjustable to and from edge engaging position; and
means for adjusting one pin to edge engaging position and adjusting the other pin from edge engaging position and vice versa.

6. The invention according to claim 5 wherein:
said means for adjusting said pins includes spring means for longitudinally adjusting each pin, and means for moving one pin against the urge of said spring means and permitting movement of the other pin by said spring means and vice versa.

7. The invention according to claim 6 wherein:
said spring means for each pin biases said pin from edge engaging position.

8. In a tape transport:
guide means for one edge of a first or of a second given width tape;
a first guide pin for the other edge of said first given width tape located in a line from said guide means normal to the direction of tape feed and longitudinally adjustable to and from edge engaging position;
a second guide pin for the other edge of said second given width tape located on said line from said guide means and longitudinally adjustable to and from edge engaging position;
spring means for biasing each pin from edge engaging position;
a movable member having a face for engaging one end of said pins for restraining said pins in edge engaging position against the urge of said spring means, said member having an opening in said face for registration with each pin to permit movement of said pin by its spring from edge engaging position; and
means for moving said member to bring one opening into registration with the related pin and the other opening from registration with the related pin and vice versa.

9. The invention according to claim 8 wherein:
said member having said openings is cylindrical and is rotatable to bring said openings to and from registration with the associated pins.

10. The invention according to claim 9 including:
electrical switching means adjustable to one circuit controlling position upon rotation of said cylindrical member to bring one of said openings from registration with the related pin and adjustable to a second circuit controlling position upon rotation to said cylindrical member to bring the other opening from registration with the related pin.

References Cited in the file of this patent

UNITED STATES PATENTS 3,006,521 Wapling et al. ........... Oct. 31, 1961